United States Patent [19]

Sigg et al.

[11] Patent Number: 4,552,258

[45] Date of Patent: Nov. 12, 1985

[54] CLUTCH ARRANGEMENT FOR POWER TRANSMISSION, ESPECIALLY A REDUCTION GEAR DRIVE UNIT FOR MARINE VESSELS

[75] Inventors: Hans Sigg, Mutschellen; Otto Staedeli, Menzingen, both of Switzerland

[73] Assignee: Maag Gear Wheel & Machine Company Limited, Zurich, Switzerland

[21] Appl. No.: 575,469

[22] Filed: Jan. 30, 1984

[30] Foreign Application Priority Data

Feb. 2, 1983 [CH] Switzerland .............................. 574/83

[51] Int. Cl.$^4$ ....................... F16D 23/02; F16D 41/22
[52] U.S. Cl. .................................. 192/67 A; 192/48.8; 192/48.5
[58] Field of Search ................... 192/48.8, 48.5, 53 H, 192/67 A, 99 S

[56] References Cited

U.S. PATENT DOCUMENTS

| | | | |
|---|---|---|---|
| 2,986,249 | 5/1961 | Sinclair et al. | 192/67 A |
| 3,078,975 | 2/1963 | Eaton | 192/48.5 |
| 3,326,056 | 6/1967 | Clements | 192/67 A |
| 3,458,021 | 7/1969 | Clements et al. | 192/67 A |
| 3,480,123 | 11/1969 | Anderson et al. | 192/48.5 |
| 3,563,354 | 2/1971 | Sigg | 192/67 A |
| 3,620,336 | 11/1971 | Clements | 192/67 A |
| 3,651,907 | 3/1972 | Myer, Jr. | 192/67 A |
| 4,250,985 | 2/1981 | Clements | 192/67 A |
| 4,454,938 | 6/1984 | Clements | 192/67 A |
| 4,463,621 | 8/1984 | Fisher | 192/48.8 |

Primary Examiner—Henry C. Yuen
Attorney, Agent, or Firm—Werner W. Kleeman

[57] ABSTRACT

An engageable toothed or jaw clutch is disposed in each of two parallel power transmission paths of a reduction gear unit. One of the clutches is a self-engaging main clutch having a synchronizing device and the other is a subsidiary clutch without a synchronizing device. The engageable clutch splines or gearing of each clutch are helically toothed and have substantially no clearance or play. Both clutches are interconnected by a converter or actuating mechanism with substantially no play. The converter or actuating mechanism translates the engagement motion of the main clutch into an engagement option of the subsidiary clutch.

6 Claims, 8 Drawing Figures

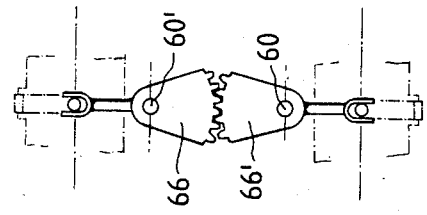
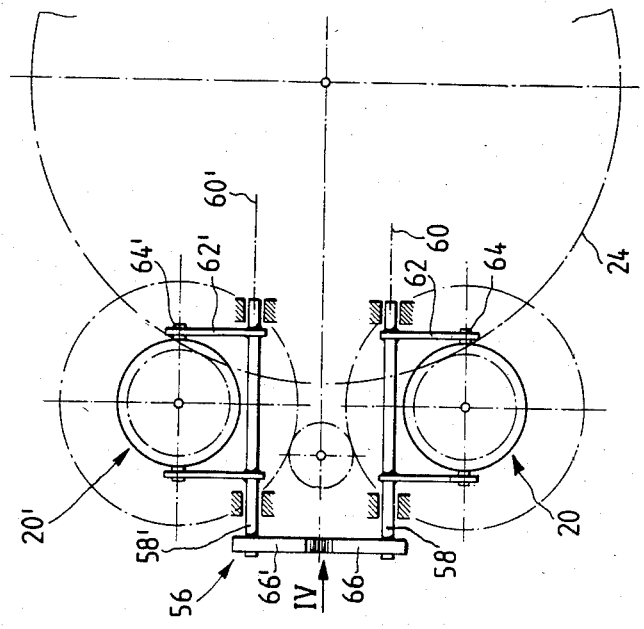
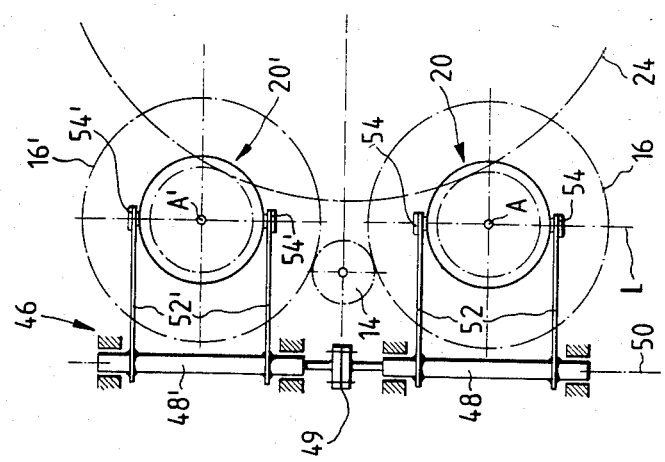

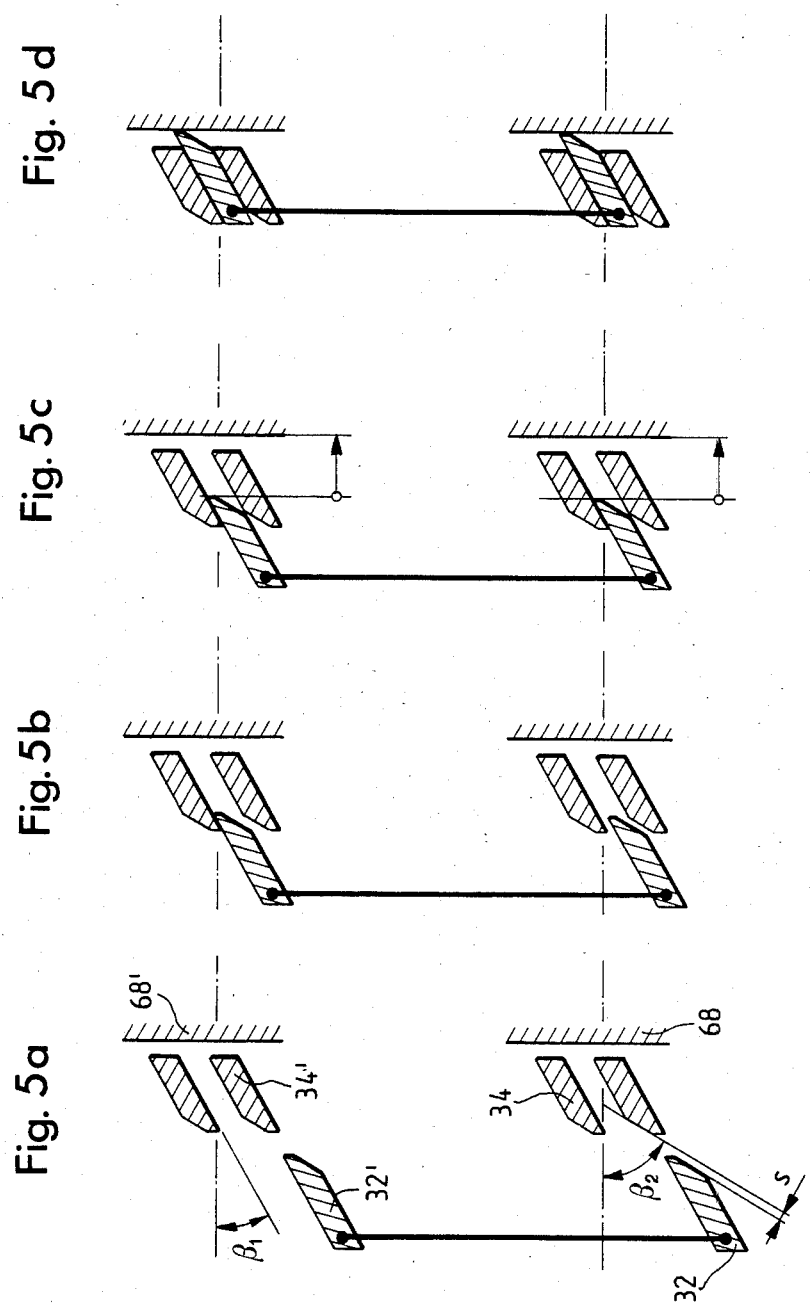

CLUTCH ARRANGEMENT FOR POWER TRANSMISSION, ESPECIALLY A REDUCTION GEAR DRIVE UNIT FOR MARINE VESSELS

BACKGROUND OF THE INVENTION

The present invention broadly relates to a clutch device or arrangement for a power transmission and, more specifically, pertains to a new and improved construction of a clutch device or arrangement for marine vessel power transmission units having at least two switchable, i.e. engageable and disengageable jaw or toothed clutches disposed in parallel power transmission paths and a converter or actuating mechanism, wherein one of the clutches is a main self-engaging clutch having a synchronizing device and at least one further clutch is a subsidiary clutch without a synchronizing device. The converter translates the engaging motion of the main clutch into an engaging motion of the subsidiary clutch.

Clutch arrangements of this type are mainly employed in so-called locked-train transmissions, i.e. transmissions having multiple power paths and in which a drive pinion meshes with gear wheels on parallel intermediate or counter shafts each driving an intermediate pinion through switchable jaw or toothed clutches and the intermediate pinions mesh with a common main or large drive gear. Such transmission units are used, for instance, in marine vessels with multiple engine drive to couple a gas turbine with the propeller shaft or uncouple it according to requirements. In comparison to other power transmissions with multiple power paths and only one engageable clutch disposed ahead of the drive pinion, power transmissions of the type described have the advantage that the first transmission or reduction stage of the gear set comprising the drive pinion and the intermediate gears meshing with it is also taken out of operation when the associated engine, for instance gas turbine, is disconnected by disengaging the engageable jaw or toothed clutches. This has the result that only the second transmission or reduction gear stage comprising the intermediate pinions and the main drive gear meshing with them are maintained in motion by a further rotation of the driven or power output shaft, for instance propeller shaft.

When engaging the jaw or toothed clutches of a clutch arrangement of the type described, care must be taken that the main clutch not be subjected to a torque load, or be subjected to only a minimal torque, as long as the subsidiary clutch is not engaged. A premature loading of the main clutch would torsionally stress the associated intermediate shaft producing a misalignment of the clutch teeth or splines of the subsidiary clutch and consequently preventing trouble-free engagement. It must on the other hand also be avoided that the subsidiary clutch be subjected to appreciable torque loading before it is fully engaged, since such loading could give rise to frictional resistance forces between the clutch teeth or splines of the subsidiary clutch which overload the converter or actuating mechanism causing it to distort and possibly block if it is, for instance, a lever or bar linkage.

In known clutch arrangements of the type described a helically toothed or splined coupling sleeve forms one half of each jaw or toothed clutch. The coupling sleeve engages an intermediate or counter shaft by means of helical teeth or splines. Significant in this respect are British Pat. No. 1,076,273, published July 19, 1967, German Pat. No. 2,900,414, published Sept. 17, 1970, and European Pat. No. 0 002 888, published July 11, 1979. This coupling sleeve has straight teeth or splines which can engage with complementary straight teeth or splines of a second clutch half. The synchronizing device of the main clutch comprises pawls mounted on the helically splined or toothed coupling sleeve and cooperating with either the straight toothed spline or teeth of the other jaw or toothed clutch half or special ratchet teeth. Significant in this respect are further the aforementioned British Pat. No. 1,076,273, FIG. 6 and German Pat. No. 2,900,414. When the pawls transmit a torque from one half of the clutch to the other, the helical spline or screw thread between the coupling sleeve and its associated intermediate shaft converts it into an axial force which displaces the coupling sleeve, thus engaging the clutch splines or teeth and disengaging the pawls. In order to unload the pawls, the main clutch has helical entry teeth which engage in advance of the clutch teeth proper to effect the full engagement in place of the pawls. The entry teeth finally disengage again. Significant in this respect is the aforementioned German Pat. No. 2,900,414, FIG. 3a.

In known designs, the converter or actuating mechanism is formed by a two-armed or rocking lever having a claw at each end which fits into a ring groove in each of the coupling sleeves with considerable axial play. The purpose of the play is to assure that the synchronizing device of the main clutch first moves only the main clutch in the axial direction until the entry teeth engage. Then further axial motion brings the subsidiary clutch or clutches into engagement. Then their helically-splined coupling sleeves begin to generate sufficient axial force to complete the engagement. The purpose of this arrangement is to relieve the main clutch of the load of shifting the helically-splined coupling sleeve of the subsidiary clutch or clutches. It was heretofore believed that considerable play between the clutch splines or teeth of the subsidiary clutch was essential. This has the result that the main clutch begins to transmit a torque force before the subsidiary clutch. In order to avoid that the main clutch carries considerably more load than the subsidiary clutch as a result of this teeth clearance or play of the subsidiary clutch when both clutches are engaged, in one of the constructions described in the aforementioned European Pat. No. 0 002 888 the main clutch is disposed in a force transmission path whose torsional resistance is considerably less than that of the force transmission path in which the subsidiary clutch is disposed.

The excessive tooth clearance provided and considered essential in heretofore known constructions gives rise to disturbing noises (tooth pounding) when rotational oscillations occur in the transmission. Such oscillations cannot always be avoided in marine transmissions. Producing a locked-train power transmission with intermediate or counter shafts of differing torsional rigidity or stiffness involves considerable additional expense in comparison to a design with fully identical intermediate or counter shafts. Finally, in known clutch or coupling arrangements of the type described it can hardly be avoided that the pawls provided for the synchronization of the main clutch are heavily loaded when unfavorable conditions of operation coincide. This can lead to damage to the pawl and ratchet drive with the possible consequence that the main clutch and therefore also the subsidiary clutch can no longer be engaged.

SUMMARY OF THE INVENTION

Therefore, with the foregoing in mind it is a primary object of the present invention to provide a new and improved construction of a jaw or toothed clutch which does not have associated with it the aforementioned drawbacks and shortcomings of the prior art constructions.

Another and more specific object of the present invention aims at providing a new and improved construction of a jaw or toothed clutch of the previously mentioned type which has a greater degree of operational reliability and generates less noise than known arrangements of this type.

Yet a further significant object of the present invention aims at providing a new and improved construction of a jaw or toothed clutch of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the clutch device of the present invention is manifested by the features that the engaging teeth or splines of all clutches are constructed as helical teeth or splines having substantially no clearance or play, and the converter or actuating mechanism interconnects the clutches essentially free of play or clearance.

This assures that, during engagement or disengagement, none of the clutches can transmit a torque force or torque greater than the negligibly small torque force resulting from the axial force necessary to engage or disengage the corresponding clutch. Disengagement also takes place automatically when a reversal of torque occurs. Each of the clutches can transmit a propulsion or service torque only when it has reached a limit stop and is therefore fully engaged. The flank clearance or tooth play of the spline teeth is kept as small as is reasonably possible, i.e., on the order of a few hundredths of a millimeter, in order to give, in combination with gears whose flank clearances or tooth play is or are maintained within usual tolerances, quiet running comparable with that of a constant mesh transmission of the same size and operating specifications. The converter or actuating mechanism is only moderately loaded when engaging the clutch device of the invention. It is not subject to the danger of locking up or binding. Due to the play or clearance-free design of the actuating mechanism, the clutches, during engagement, reach their limit stop positions simultaneously and therefore also simultaneously begin to transmit torque force or torque. The intermediate or counter shafts can therefore have the same degree of torsional rigidity and be constructed relatively cheap without compromising distribution of load.

In a preferred embodiment of the invention, the engageable clutch teeth or splines of all clutches have the same helix angle.

The converter or actuating mechanism can, as in the aforementioned known clutch arrangements, comprise an arrangement of levers having a pivot axis transverse to the axes of the clutches. In such case, the actuating mechanism is preferably structured to operate the clutches with identically oriented motions. In contrast, the clutches of heretofore known types of clutch arrangements have mutually opposed directions of engagement motion and therefore also of disengagement motion which requires the main and subsidiary clutches to be differently constructed or a least to be disposed in reversed orientations.

When the actuating mechanism comprises a single-armed or single lever, as in the known clutch devices, an advantageous embodiment of the invention can be realized when the pivot axis of the lever extends substantially parallel to a line commonly perpendicular to the clutch axes.

Alternatively, the actuating mechanism can comprise two levers whose pivot axes extend at right angles to the common plane of both clutch axes in spaced relationship to one another. The levers are coupled by suitable rolling contact gears, such as sector gears.

A self-acting synchronous clutch such as is known from German Pat. No. 1,959,184, and the cognate U.S. Pat. No. 3,563,354, granted Feb. 16, 1971, to which reference may be made for further details and the description of which is incorporated herewith by reference, is particularly well-suited for the main clutch.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 shows a schematic end view of the clutch device taken in the direction of the arrow II in FIG. 1;

FIG. 3 is a schematic view of an alternate embodiment of the invention corresponding to the view of FIG. 2;

FIG. 4 is a partial view in the direction of the arrow IV in FIG. 3; and

FIGS. 5a through 5d schematically show an engagement cycle of the clutch device.

DETAILED DESCRIPTION OF THE PREFERRED EMBODIMENTS

Figure 1:
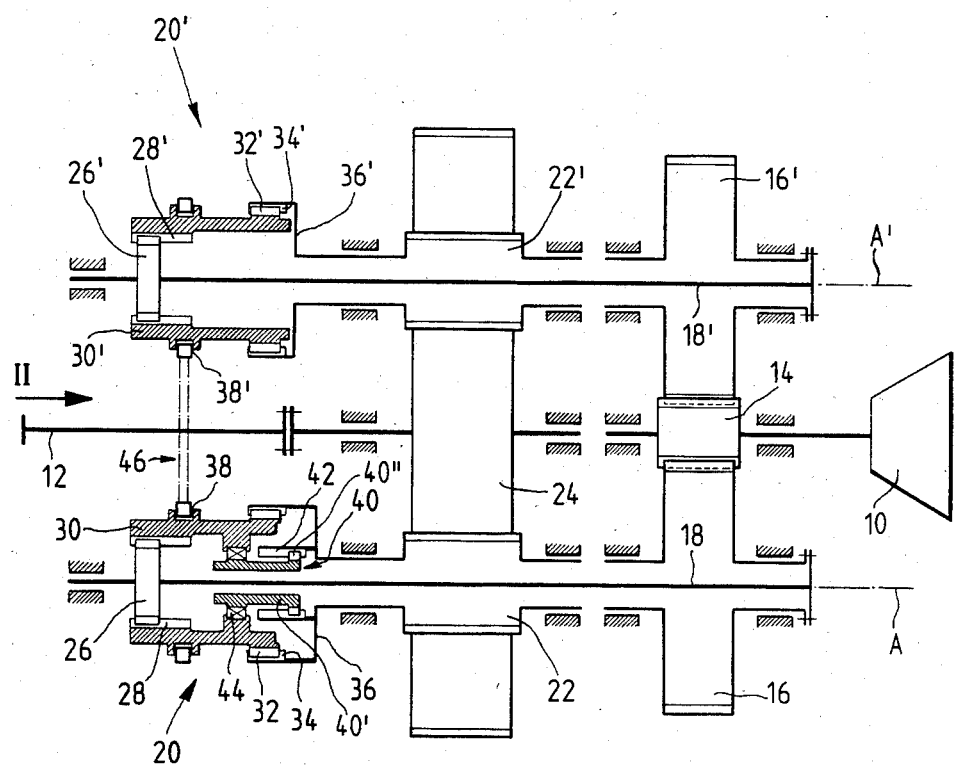
FIG. 1 shows a schematic representation in partial section of the plan view of a marine vessel transmission or gearing having a clutch device according to the invention.

Describing now the drawings, it will be understood that the locked-train marine power transmission unit shown in FIG. 1 couples a gas turbine 10 with a propeller shaft 12. The first gear stage of the power transmission is formed by a main drive pinion 14 driven by the gas turbine 10 and two identical gears 16 and 16' meshing with the drive pinion 14. Each of the gears 16 and 16' is connected to an intermediate pinion 22 and 22' through a torsion or quill shaft 18 and 18' and either a main clutch 20 or a subsidiary clutch 20'. The two intermediate pinions 22, 22' commonly mesh with a large or main drive gear 24 to form a second stage of the gear set. The main drive gear 24 is permanently coupled to the propeller shaft 12.

Both clutches 20 and 20' are switchable, i.e. engageable and disengageable toothed or jaw clutches each having a straight toothed clutch arbor or half 26 and 26' on its power input side which is in constant mesh with a corresponding internal spline or teeth 28 and 28' in the end region of an axially movable coupling sleeve 30 and 30', respectively. Each of the coupling or clutch sleeves 30 and 30' have a helical clutch spline or teeth 32 and 32' in their output end regions capable of engaging a complementary clutch spline or teeth 34 and 34' on a driven or power output coupling body or half 36 and 36'. Each of the coupling sleeves 30 and 30' also has an external ring or annular groove 38 and 38'.

Both clutches 20 and 20' are completely identical in the components which have been described. The clutch axes A and A' are arranged at equal distances from a central plane of the transmission containing the axes of the main drive pinion 14 and the large or main drive gear 24.

The only difference between the clutches 20 and 20' is that only the main clutch 20 has a synchronizing device 40. The synchronizing device 40 takes the form of a synchronizing hub or sleeve 40' having a helical spline or teeth 40" engaging a corresponding helical spline or teeth 42 on the power output or take-off side of the coupling body or half 36 and capable of engaging the coupling sleeve 30 by means of a pawl and ratchet drive or locking mechanism 44. The main clutch 20 can, for example, correspond to the one known from the aforementioned U.S. Pat. No. 3,563,354.

Both coupling or clutch sleeves 30 and 30' are coupled to one another by a converter or actuator mechanism 46, such as an actuating fork mechanism 46, as can be seen in FIGS. 1 and 2. This is substantially constituted by two shafts 48 and 48' joined together in rotationally adjustable relationship by elastic flanges or coupling means 49 and whose common geometrical axis forms a pivot axis 50 of the actuating mechanism 46 acting as a lever mechanism. A pair of radial lever arms or arm members 52 and 52' is mounted on each of the shafts 48 and 48'. A guide or bearing block 54 and 54' is mounted at the end of each lever arm 52 and 52'. Each pair of bearing blocks 54, 54' engages the ring groove 38, 38' of the associated coupling sleeve 30, 30'. The pivot axis 50 extends substantially parallel to a line L commonly perpendicular to both clutch axes A and A'.

In the embodiment shown in FIGS. 3 and 4, both coupling sleeves 30 and 30' are coupled to one another by an actuating mechanism or converter 56 different from that of FIG. 2. It comprises two shafts 58 and 58' each having a pivot axis 60 and 60' extending substantially perpendicular to the common plane of the two clutch axes A and A' and a pair of radial lever arms or arm members 62 and 62'. A guide or bearing block 64 and 64' is mounted on the ends of the lever arms 62 and 62'. Each pair of bearing blocks 64 and 64' engages the related ring groove 38 and 38' of the associated coupling sleeve 30 and 30'. A toothed segment or sector gear 66 and 66' is mounted on each shaft 58 and 58'. These sector gears 66 and 66' intermesh.

A common feature of both converters or actuating mechanisms 46 and 56 is that they translate with as little play as possible each axial motion of the coupling sleeve 30 into an equally great and equally oriented axial motion of the other coupling sleeve 30'.

FIGS. 5a through 5d illustrate details of mutually engaging clutch splines or teeth 32 and 34 as well as 32' and 34'. These clutch splines or teeth have identical helix angles $\beta_1$ considerably smaller or less steep than the helix angle $\beta_2$ of the helical spline or teeth 42 of the synchronizing device 40. The teeth of all clutch splines or teeth 32, 34 and 32', 34' are bevelled at their mutually engaging ends at a bevel angle $\beta_2$, which facilitates engagement. Thus the helix angle of the helical spline or teeth 42 of the synchronizing device 40 and the bevel angle $\beta_2$ of all clutch splines or teeth 32, 34 and 32', 34' are substantially identical.

It will be seen from FIG. 5a that, as engagement begins, there is a slight engagement clearance s on the order of about 0.5 mm between the engaging clutch splines or teeth 32 and 34 as well as 32' and 34'.

As can be seen in FIG. 5b, the two clutches 20 and 20' begin to engage approximately simultaneously. It does not matter which pair of clutch splines or teeth 32, 34 or 32', 34' first enters mutual engagement. Slight inaccuracies of manufacture or assembly are compensated by mutual rotation of the transmission rotors within their flank clearance or play.

According to FIG. 5c, the flanks of the splines or teeth of both clutches 20 and 20' enter into contact and can now continue their engagement motion completely synchronously until they reach their end position, which is defined by a limit stop or abutment 68, 68'. Only now are the clutches 20 and 20' capable of transmitting torque forces. Upon reaching their end position shown in FIG. 5d, both clutches must still be permitted to equalize the load between them in order that they can transmit the full torque force or rotational movement. For this purpose, either the converter or actuator mechanism 46 or 56 is provided with an elastic member or coupling 49 (see FIG. 2) or each shaft member 58, 58' is elastically constructed (see FIG. 3).

Both clutches 20 and 20' disengage automatically upon torque reversal. They can be fully returned to their initial position by means of a mechanical energy storage device or a hydraulic cylinder. In their initial position, any mutual contact of the clutch splines or teeth 32 and 34 or 32' and 34' is impossible.

While there are shown and described present preferred embodiments of the invention, it is to be distinctly understood that the invention is not limited thereto, but may be otherwise variously embodied and practiced within the scope of the following claims.
ACCORDINGLY,

WHAT WE CLAIM IS:

1. A clutch device for a power transmission unit, especially a toothed clutch device for a marine propulsion gear transmission, comprising:
    a self-engaging main clutch disposed in a first power transmission path of said power transmission unit;
    synchronizing means provided for said self-engaging main clutch;
    at least one subsidiary clutch devoid of any synchronizing means and being disposed in a further power transmission path acting in parallel to said first power transmission path;
    an actuating mechanism for translating an engagement motion of said main clutch into an engagement motion of said at least one subsidiary clutch;
    each of said main and subsidiary clutches being provided with helical clutch teeth engaging corresponding, mating, clutch teeth with substantially no clearance; and
    said actuating mechanism coupling the main and subsidiary clutches with substantially no clearance.

2. The clutch device as defined in claim 1, wherein:
    each of said main and subsidiary clutches being provided with said engageable helical clutch teeth which have identical helix angles.

3. The clutch device as defined in claim 1, wherein:
    the actuating mechanism comprises a lever arrangement pivoting about an axis extending substantially transverse to axes of rotation of said main and subsidiary clutches and constraining the clutches to identical motions.

4. The clutch device as defined in claim 1, wherein:
said actuating mechanism translates said engagement motion of said main clutch to said at least one subsidiary clutch with substantially no clearance such that said subsidiary clutch engages substantially simultaneously with said main clutch.

5. A clutch device for a power transmission unit, especially a toothed clutch device for a marine propulsion gear transmission, comprising:
a self-engaging main clutch disposed in a first power transmission path of said power transmission unit;
syncronizing means provided for said self-engaging main clutch;
at least one subsidiary clutch devoid of any synchronizing means and being disposed in a further power transmission path acting in parallel to said first power transmission path;
an actuating mechanism for translating an engagement motion of said main clutch into an engagement motion of said at least one subsidiary clutch;
each of said main and subsidiary clutches being provided with helical clutch teeth engaging corresponding, mating, clutch teeth with substantially no clearance;
said actuating mechanism coupling the main and subsidiary clutches with substantially no clearance;
said actuating mechanism comprising a lever arrangement pivoting about an axis extending substantially transverse to axes of rotation of said main and subsidiary clutches and constraining the clutches to identical motions; and
said lever arrangement of the actuating mechanism comprises a lever pivotable about said axis of rotation which extends substantially parallel to a line commonly perpendicular to said axes of rotation of said main and subsidiary clutches.

6. A clutch device for a power transmission unit, especially a toothed clutch device for a marine propulsion gear transmission, comprising:
a self-engaging main clutch disposed in a first power transmission path of said power transmission unit;
synchronizing means provided for said self-engaging main clutch;
at least one subsidiary clutch devoid of any synchronizing means and being disposed in a further power transmission path acting in parallel to said first power transmission path;
an actuating mechanism for translating an engagement motion of said main clutch into an engagement motion of said at least one subsidiary clutch;
each of said main and subsidiary clutches being provided with helical clutch teeth engaging corresponding, mating, clutch teeth with substantially no clearance; and
said actuating mechanism coupling the main and subsidiary clutches with substantially no clearance;
said actuating mechanism comprising a lever arrangement pivoting about two axes extending substantially transverse to axes of rotation of said main and subsidiary clutches and constraining the clutches to identical motions;
said lever arrangement of the actuating mechanism comprising two levers each pivotable about a respective axis of said two axes which extend in mutual spaced relationship and substantially perpendicular to a plane containing said axes of rotation of said main and subsidiary clutches; and
sector gear means for mutually operatively coupling said two levers with one another.

* * * * *

UNITED STATES PATENT AND TRADEMARK OFFICE
CERTIFICATE OF CORRECTION

PATENT NO. : 4,552,258
DATED : November 12, 1985
INVENTOR(S) : Hans Sigg et al

It is certified that error appears in the above—identified patent and that said Letters Patent is hereby corrected as shown below:

In the Abstract, line 12, at the beginning of the line please delete "option" and insert --motion--

Signed and Sealed this

Twenty-first Day of January 1986

[SEAL]

Attest:

DONALD J. QUIGG

Attesting Officer

Commissioner of Patents and Trademarks